United States Patent [19]

Ingalls

[11] 4,400,007
[45] Aug. 23, 1983

[54] METHOD AND STRUCTURE FOR ADJUSTING CASTER OR CAMBER

[75] Inventor: William E. Ingalls, Longmont, Colo.

[73] Assignee: Thomas W. O'Rourke, Boulder, Colo.

[21] Appl. No.: 334,782

[22] Filed: Dec. 28, 1981

[51] Int. Cl.³ .............................................. B62D 17/00
[52] U.S. Cl. ..................................................... 280/661
[58] Field of Search ......................................... 280/661

[56] References Cited

U.S. PATENT DOCUMENTS

| | | | |
|---|---|---|---|
| 2,859,058 | 11/1958 | Traugott | 280/661 |
| 3,124,370 | 3/1964 | Traugott | 280/661 |
| 3,163,441 | 12/1964 | Traugott | 280/661 |
| 4,026,578 | 5/1977 | Mattson | 280/661 |
| 4,037,680 | 7/1977 | Grove | 280/661 |
| 4,232,880 | 11/1980 | Dickerson | 280/661 |
| 4,252,338 | 2/1981 | Ingalls et al. | 280/661 |

Primary Examiner—Robert R. Song
Attorney, Agent, or Firm—O'Rourke & Harris

[57] ABSTRACT

Apparatus for positioning an offset or skewed bushing body with small incremental adjustments in a suspension member having fixed positioning lugs to secure the bushing body having an offset or skewed bore, a number of locating projections defined around the outer circumference thereof, an independent lock ring having a plurality of indentations defined around the inner circumference of the ring and adapted to engage the locating projections of the bushing body, the lock ring further having at the outer circumference thereof a plurality of indent pairs positioned to engage the locating lugs of the suspension member, and means to secure the lock ring to the bushing body, whereby the offset or skewed bushing body may be positioned in a suspension member, receive the tapered short portion of a ball joint, rotated to locate the ball joint with appropriate corrections to caster and/or camber, and maintained in such position by the locking ring which engages the locating projections of the bushing body at the inner circumference and the locating lugs of the suspension member at the outer circumference.

10 Claims, 3 Drawing Figures

METHOD AND STRUCTURE FOR ADJUSTING CASTER OR CAMBER

BACKGROUND OF THE INVENTION

This invention relates generally to adjustment of steerable wheels located by ball joints on rigid axle vehicles, including 4-wheel drive arrangements in which the wheels are steerable and driven, and more particularly pertains to a method and structure for locating offset and/or skewed bushings to adjust caster and camber geometry of vehicles in which the ball joint shaft is received by a bushing located in the vehicle by fixed lugs.

DESCRIPTION OF THE RELATED ART

Various vehicles particularly adapted for heavy load carrying, off road use etc., such as 4-wheel drive, front wheel drive and truck vehicles conventionally utilize a steerable front support for the wheels which includes a yoke at the end of the solid axle adapted to receive ball joints which in turn carry thereon a spindle assembly for the wheel at either end of the axle. The spindle assembly is thus free to turn in the ball joints.

Camber and/or caster adjustment of such axle arrangements are conventionally accomplished by one of several means. A press to bend the axle longitudinally or in torsion may be employed to correct the relationship of the attached spindle, and accordingly the wheel, relative to the roadway. Particularly in the case of a rigid axle driven wheel in which a drive shaft is carried within a tubular housing, bending is often not a desirable or workable expedient.

As disclosed in U.S. Pat. No. 4,037,680, issued July 26, 1977 to Clinton Grove, it is possible to remove the hub, spindle and associated wheel mounting means in order to insert a static shim member to correct only camber. Certainly such shim members are workable and provide for improved caster settings. However, substantial work must be expended to remove the wheel mounting portion of the assembly, a large inventory of shims must be maintained, and the shim once in place must be entirely removed and another shim inserted if an error is made or if the axle subsequently bent through use to cause further misalignment.

Another approach which provides for more convenient insertion and for correction of caster as well as camber has been utilized in several vehicles and described in U.S. Pat. No. 4,252,338, issued Feb. 24, 1981 to William E. Ingalls, et al. This approach as described in the Patent, involves an offset or skewed bushing insert which is located in the axle yoke to reposition the steering knuckle portion of the spindle assembly either away or towards the axle to correct camber, and/or forward or rearward laterally of the axle to correct caster. Such arrangement is more readily installed in that only the ball joint and ball joint bushing need only be removed and replaced by an offset or skewed bushing. However, in practice, such bushings as used in certain vehicles manufactured by the Ford Motor Company have been practical only with regard to camber correction. These vehicles are manufactured with opposed locating lugs positioned to locate the ball joint bushing relative to the yoke or other suspension member attached to the axle. Thus, if an offset or skewed bushing is employed to correct both caster and camber, unworkable numbers of individual units would have to be provided with various offsets or skewing of the bushing bore and various orientations of the locating indents to receive the lugs. As a result of such requirements, in fact bushings are available to correct only camber.

SUMMARY OF THE INVENTION

The present invention, which provides a heretofore unavailable convenience and economy in adjusting both camber and/or caster in rigid axle vehicles having locating lugs to engage in position the ball joint bushing, comprises a bushing body having an offset and/or skewed bore adapted to be positioned in the receiving portion of the vehicle in place of a conventional bushing, a lock ring having internal indents adapted to engage and locate the bushing body in numerous small incremental positions and external indents adapted to engage the vehicle lugs, and means to secure the lock ring to the bushing body. Accordingly, after measuring incorrect caster and/or camber an appropriate offset and/or skewed bushing body may be selected and located in the vehicle suspension member substantially independent of the locating lugs, rotating while observing the caster and/or camber readings, and, when appropriately oriented in the vehicle to correct both caster and/or camber, secured in such position by slipping the lock ring thereon to engage the bushing body at the internal indents of the lock ring while the external indents engage the locating lugs.

Accordingly, an object of the present invention is to try to provide new method and apparatus for adjusting camber and/or caster in vehicle suspension systems using fixed locating lugs to position a ball joint bushing to the suspension.

Another object of the present invention is to provide a new and improved camber and/or caster adjustment device which minimizes the need for an excess inventory of offset and/or skewed bushings when utilized with fixed locating lugs.

These and other objects and features of the present invention will become apparent from consideration of the following description.

DETAILED DESCRIPTION OF THE INVENTION

Figure 1:
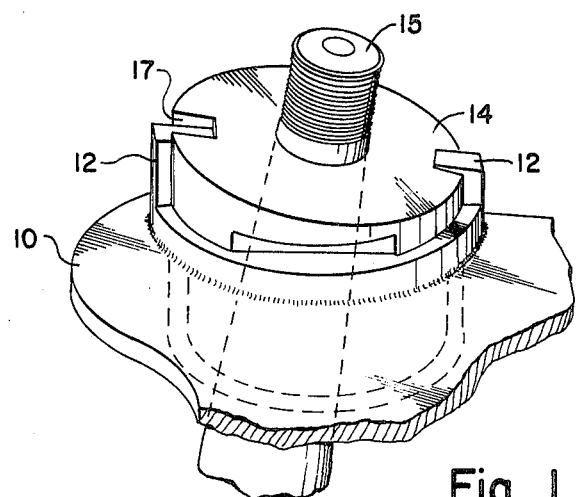
FIG. 1 is a somewhat simplified, perspective view of the prior art use of offset bushings with fixed locating lugs.

Turning now to the drawings, wherein like elements are designated by the same reference numerals throughout the various figures, a prior art example of an offset and/or skewed bushing utilized with fixed locating lugs is illustrated in FIG. 1. As illustrated, the suspension member 10 includes a pair of fixed locating lugs 12 adapted to engage conventional offset bushing 14 which in turn carries ball joint shaft 15. Bushing 14 may be smooth walled or threaded, but when used with locating lugs is most conventionally the former. As will be apparent, the angular orientation of the offset of bushing 14 is determined by the engagement of lugs 12 by indents 17. Thus it will be apparent that to correct various misalignments of caster and/or camber it would be necessary to have an array of bushings 14 not only having various offsets but also having the offsets oriented in numerous positions relative to indents 17.

Figure 2:
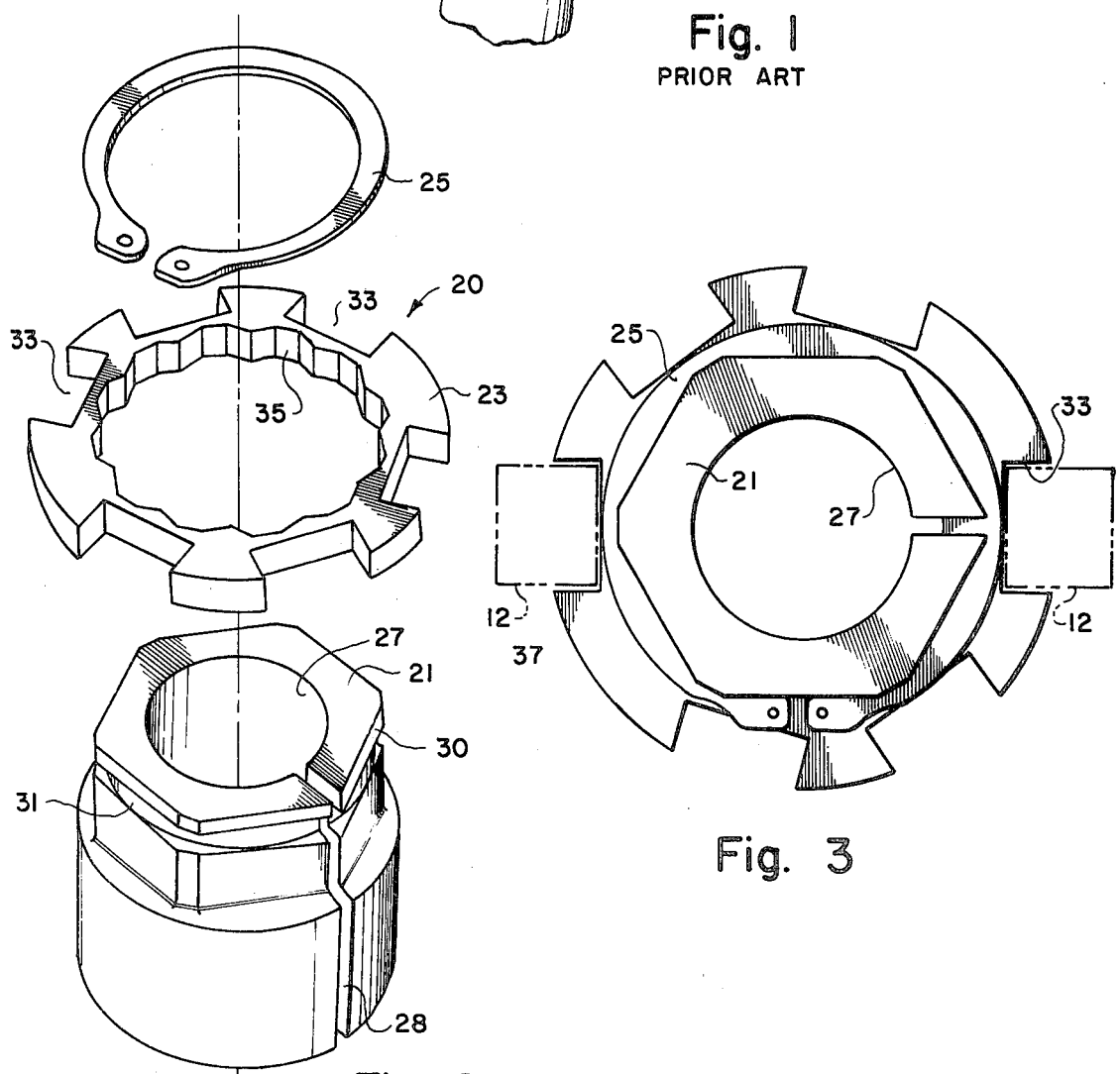
FIG. 2 is an exploded, perspective view of an improved offset bushing assembly in accord with the instant invention.

FIG. 2 illustrates bushing assembly 20 which includes bushing body 21, configured at the lower portion similar to bushing 14, but having an upper configuration such that upper bushing body 21 will not engage fixed lugs 12 when inserted in the conventional vehicle suspension member 10. Instead, lock ring 23 is provided such that fastening means 25, which is preferably a snap ring, will secure locating ring 23 in numerous orientations of bushing assembly 20 relative to lugs 12 as is apparent from FIGS. 2 and 3.

Bushing body 21 includes an offset or skewed internal tapered bore 27 and longitudinal slot 28 as is conventional in such bushings. However, at the upper portion thereof, a number of locating projections 30, preferably in the form of a conventional hex nut configuration, are provided. Groove 31 is defined around the circumference of bushing body 21 adjacent to the upper portion thereof.

Lock ring 23 as defined around the outer circumference thereof a number of indentations 33 configured to receive fixed lug members 12. At the inner circumference of lock ring 23, a number of indents 35 are defined and configured to receive locating projections 30 of bushing body 21 at numerous relative positions therebetween.

Figure 3:
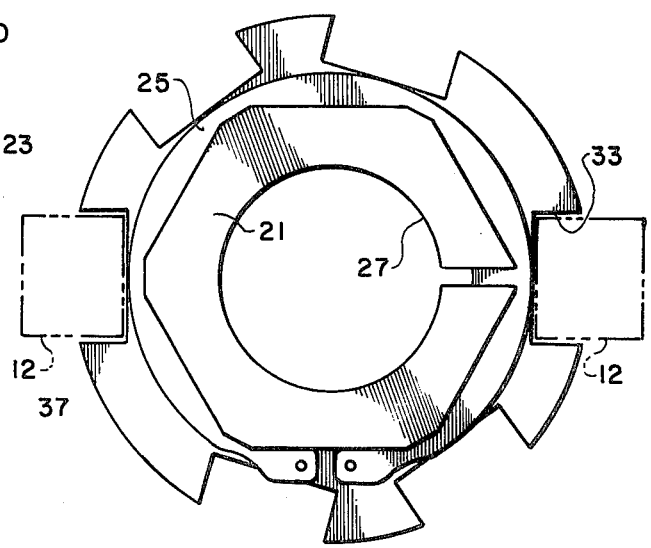
FIG. 3 is a top view of an offset bushing assembly in accord with the instant invention engaging the vehicle locating lugs.

Thus, as shown in FIG. 3, lock ring 23 may be positioned on locating projections 30 of bushing body 21 with fixed lugs 12 engaging indents 33 of lock ring 23. Securing means 25, in the form of the preferred snap ring configurations, is inserted in groove 31 to confine lock ring 23 to the upper portion of bushing body 21.

Accordingly, in practice, a user will measure the caster and camber error of the vehicle. Then reference is made to an appropriate chart calculated for the specific vehicle and to determine the required asymmetry of bore 27 of bushing body 21. Then, in a conventional manner, bushing body 21 is positioned in vehicle suspension member 10 and ball joint shaft 15 inserted therethrough. Rotational orientation of bushing body 21 may be established by an indexing means, such as longitudinal slot 28 or other indicia (not shown) relative to vehicle suspension member 10, but preferably the ball joint is assembled in the bushing and actual readings of caster and cambers are taken while rotating the bushing to provide proper orientation. Thereafter, lock ring 23 if fitted by a simple trial and error arrangement such that inner indents 35 engage locating projections 30 of bushing body 21 while exterior indentations 33 receive fixed locating lugs 12. Securing means 25 is then installed to maintain assembly 20 in a stable fixed configuration.

In summary, the bushing assembly of the instant invention includes bushing bodies which may include but a limited, conventional number of offsets and/or skewed arrangements of the bore relative to the exterior of the bushing body. However, rather than being limited to correcting only camber in vehicles utilizing fixed locating lugs in the suspension members, the bushing body when installed may be rotated to correct both caster and/or camber. When properly oriented in the vehicle to provide the desired alignment correction, the locating ring may then be positioned on the bushing body to engage both the bushing body and the fixed locating lugs of the suspension member to maintain the bushing body in the desired position. Securing means fixes the assembly as one unit.

While only the particular perferred embodiments and components of the instant invention have been specifically described and illustrated, it will be apparent to those skilled in the art that changes and modifications may be made without deviating from the scope of the invention as defined by the following claims.

What is claimed is:

1. A ball joint bushing assembly adapted to fit within a vehicle axle and suspension assembly member and to engage at least one positioning lug defined on the axle and suspension assembly member, the bushing assembly comprising, a bushing body having at least a portion thereof defined by a cylindrical outer surface disposed around an axis through the bushing body, an inner bore adapted to receive a ball joint shaft defined through the bushing body around an inner bore axis, the outer surface axis and inner bore axis being defined by two lines, the bushing body further having a plurality of locating projections defined around the bushing body adjacent an end thereof, the locating projections being positioned to be spaced from the positioning lug with the bushing body carried in the axle and suspension assembly member, a lock ring having defined centrally therethrough an opening in the form of a plurality of indents positioned around the periphery of the central opening and configured to engage the bushing body locating projections in a plurality of angular positions between the bushing body and lock ring, the lock ring further having defined at the outer edge thereof a plurality of indentations sized and positioned to engage the axle and suspension assembly member positioning lug with the lock ring fitted to the bushing body at the locating projections thereof, and securing means releasably secured to the bushing body and positioned to maintain the bushing body and the lock ring as a single assembly;

whereby the bushing body may be positioned in the the axle and suspension assembly member with the inner bore therethrough receiving a ball joint shaft, the bushing rotated within the axle and suspension assembly member to provide desired camber and caster relationships, the lock ring placed on the bushing body and engaging the locating projections thereof at the central opening indents and the positioning lug at the outer edge indentations to preclude rotation of the bushing body assembly.

2. A bushing assembly as set forth in claim 1 in which the bushing body is defined by a smooth cylindrical surface at one end thereof adapted to fit in the axle and suspension assembly member, and in which the locating projections defined at the opposite end of the bushing body are in the form of a hexagonal head configuration adapted to be engaged by a conventional wrench to aid in rotating the bushing body, with the indents of the lock ring configured to engage the points of the hexagonal configuration.

3. A bushing assembly as set forth in claim 1 in which the lock ring is substantially in the form of an annular member with the indents defined around the central opening thereof, and the indentations defined around the outer edge thereof.

4. A bushing assembly as set forth in claim 1 in which the securing means comprise a snap ring and a groove defined circumferentially around the bushing body at the locating projection portion thereof and spaced to permit the lock ring to fit between the groove and the cylindrical surface portion of the bushing body.

5. A bushing assembly as set forth in claim 1 in which the bushing body includes indicia defined thereon to identify the position of the asymmetrical inner bore relative to the outer surface of the bushing body.

6. A bushing assembly as set forth in claim 5 in which the indicia is in the form of a slot defined longitudinally from the outer surface of the bushing body to the inner bore thereof, the slot further functioning to facilitate positioning of the bushing body within the axle and suspension assembly member.

7. A bushing assembly particularly configured to fit a cylindrical opening defined in a vehicle axle and suspension assembly member and to be located therein by at least one positioning lug defined adjacent the axle and suspension assembly member opening, the bushing assembly comprising, a substantially cylindrical bushing body defined around an inner axis, the lower portion of the bushing body being defined by a smooth, cylindrical surface, and the upper portion of the bushing body being defined by a hexagonal head configuration symmetrically disposed around an axis, an inner bore defined through the bushing body around an inner bore axis which is non-coincidental with the outer surface symmetrical axis and a circumferential groove defined around the bushing body at the hexagonal head portion thereof, an annular lock ring having a central opening defined by a plurality of indents, the indents being configured to engage the hex head portion of the bushing body in a number of angular relationships between the bushing body and lock ring, the lock ring further having around the outer periphery thereof a plurality of indentations each adapted and configured to receive the positioning lug of the axle and suspension assembly member, and a snap ring adapted to fit within the circumferential groove defined in the bushing body to secure the bushing body and lock ring together as the bushing assembly.

8. A method to correcting caster and camber misalignment in vehicles having a suspension system in which a wheel-carrying spindle member is ultimately supported through at least one ball joint supported in a suspension member having a positioning lug and including a bushing insert which receives the ball joint shaft, the method comprising, determining the misaligment between the spindle member and suspension members, selecting a bushing insert having an asymmetric bore appropriate to correct the misalignment and locating projection at a portion thereat, inserting the selected bushing insert in the suspension member with the ball joint shaft extending through the bushing insert, rotating the bushing insert within the suspension member to locate the asymmetric bore to correct the misalignment, positioning a lock ring on the bushing insert to engage both the locating projections on the bushing insert and the positioning lugs on the suspension member to preclude rotation of the bushing insert; and securing the lock ring and bushing insert into a single assembly.

9. A method as set forth in claim 8 in which the bushing insert is rotated by means of a wrench engaging locating projections in the form of a hexagonal head defined on the bushing insert, and in which the lock ring engages the hexagonal head portion of the bushing insert at one of a plurality of indents adapted to interface with the bushing insert.

10. A method as set forth in claim 8 in which the lock ring is secured to the bushing insert by inserting a snap ring in a groove defined circumferentially around the bushing insert at a position on the opposite side of the lock ring as the suspension member.

* * * * *